US010772325B2

(12) United States Patent
Barry et al.

(10) Patent No.: US 10,772,325 B2
(45) Date of Patent: Sep. 15, 2020

(54) FUNGICIDE PREPARATION

(71) Applicant: BIOPHARM NZ LIMITED, Hamilton (NZ)

(72) Inventors: Michael-John Joseph Barry, Hamilton (NZ); Bernard Cecil Kimble, Auckland (NZ)

(73) Assignee: BIOPHARM NZ LIMITED, Whitiora Hamilton (NZ)

( * ) Notice: Subject to any disclaimer, the term of this patent is extended or adjusted under 35 U.S.C. 154(b) by 63 days.

(21) Appl. No.: 15/780,112

(22) PCT Filed: Nov. 28, 2016

(86) PCT No.: PCT/IB2016/057152
§ 371 (c)(1),
(2) Date: May 30, 2018

(87) PCT Pub. No.: WO2017/093875
PCT Pub. Date: Jun. 8, 2017

(65) Prior Publication Data

US 2018/0343856 A1 Dec. 6, 2018

(30) Foreign Application Priority Data

Dec. 1, 2015 (ZA) ................................ 2015/08774

(51) Int. Cl.
*A01N 65/08* (2009.01)
*A01N 25/30* (2006.01)
*A01N 25/04* (2006.01)

(52) U.S. Cl.
CPC ............ *A01N 25/30* (2013.01); *A01N 25/04* (2013.01); *A01N 65/08* (2013.01)

(58) Field of Classification Search
CPC ..................................................... A01N 65/08
See application file for complete search history.

(56) References Cited

U.S. PATENT DOCUMENTS

2015/0335033 A1 11/2015 Klaasen

OTHER PUBLICATIONS

Bibliographic information for Western Cape University, ZA 200906942 A, 2012.*
Pool, et al, "The environmental toxicity of Dicerothamnus rhinocerotis and Galenia africana", Sep. 15, 2009, pp. 4465-4468, vol. 8, No. 18, African Journal of Biotechnology.
Pool, et al, "The immunotoxicity of Dicerothamnus rhinocerotis and Galenia Africana", Aug. 18, 2009, pp. 3846-3850, vol. 8, No. 16, African Journal of Biotechnology.

Mabusela, et al, "An antifungal active extract from the aerial parts of Galenia Africana", pp. 123-131, 11$^{th}$ Napreca Symposium Book of Proceedings, Antananarivo, Madagascar.

International Search Report dated Jan. 20, 2017 in International Application No. PCT/IB2016/057152.
Written Opinion dated Jan. 20, 2017 in International Application No. PCT/IB2016/057152.

* cited by examiner

*Primary Examiner* — Rosanne Kosson
(74) *Attorney, Agent, or Firm* — Stephen J. Weyer, Esq.; Stites & Harbison, PLLC

(57) ABSTRACT

The invention discloses a fungicide preparation, which includes an extract and/or isolate of *Galena africana*; and mono-propylene glycol as a solvent and/or SAS as surfactant and/or polysuganate as a mild anionic surfactant. The extract and/or isolate may be KB05. The preparation may include mono-propylene glycol as a solvent for KBO5 and if kept anhydrous, the KBO5 remains stable in the mixture. The mixture may act as a low hazard stable source of KBO5 that can be mixed with the desired anionic surfactant and water to make formulations suitable for various applications. The preparation may include SAS as surfactant for producing stable solutions/micro emulsions of KBO5 in combination with propylene glycol.

11 Claims, No Drawings

FUNGICIDE PREPARATION

FIELD OF INVENTION

The present invention relates to a fungicide preparation.

More particularly, the present invention related to a fungicide preparation which includes an extract of *Galena africana*.

BACKGROUND TO INVENTION

KBO5 is a plant extract isolated from *Galena africana* L. plant containing several bioflavonoids. KBO5 has been found to be an active biocide, effective against a range of micro-organisms. However KBO5 is not very soluble and this limited its effectiveness.

It is an object of the invention to suggest a fungicide preparation, which will assist in overcoming these problems.

SUMMARY OF INVENTION

According to the invention, a fungicide preparation includes
  (a) an extract and/or isolate of *Galena africana*; and
  (b) mono-propylene glycol as a solvent and/or SAS as surfactant and/or polysuganate as a mild anionic surfactant.

The extract and/or isolate may be KB05.

The preparation may include mono-propylene glycol as a solvent for KBO5 and if kept anhydrous, the KBO5 may remain stable in this simple mixture.

This mixture may be adapted to act as a low hazard stable source of KBO5 that can be mixed with the desired anionic surfactant and water to make formulations suitable for various applications.

The preparation may include SAS as surfactant for producing stable solutions/micro emulsions of KBO5 in combination with propylene glycol, and where appropriate this mixture should be used.

The preparation may include polysuganate as a mild anionic surfactant that can be used in leave-on cosmetic applications.

The polysuganate may be 100% naturally derived from renewable resources.

The preparation may have the following product specifications:
  (a) 5-40% KB05 concentrated product;
  (b) Dilutable to achieve the desired level of biological efficacy from 50 to 10 000 ppm KB05 depending on target organism/application;

(c) Naturally derived ingredients;

(d) Ingredients appropriate for agricultural or veterinary application; and/or (e) Concentration to be suitable for use in personal care leave-on and wash-off products.

The preparation may be provided in the following formulations:

(a) Oil in water emulsion;

(b) Suspension of very finely divided, insoluble active that is dispersible in water; and/or (c) Direct solubilisation of active.

DETAILED DESCRIPTION OF INVENTION

The invention will now be described by way of example.

According to the invention, a fungicide preparation includes an extract and/or isolate of *Galena africana*.

The extract and/or isolate is KB05.

The preparation includes mono-propylene glycol as a solvent for KBO5 and if kept anhydrous, the KBO5 remains stable in this simple mixture. This mixture acts as a low hazard stable source of KBO5 that can be mixed with the desired anionic surfactant and water to make formulations suitable for various applications.

The preparation includes SAS as surfactant for producing stable solutions/micro emulsions of KBO5 in combination with propylene glycol, and where appropriate this mixture should be used.

The preparation includes polysuganate as a mild anionic surfactant that can be used in leave-on cosmetic applications.

The polysuganate may be 100% naturally derived from renewable resources.

Other anionic surfactants can be used or included to provide functions such as improved, wetting or spreading characteristics for example sodium dioctyl sulphosuccinate.

Experiments

Various experiments were conducted to find methods of solubilising the KBO5 and rendering it more effective as a biocide and to meet the following product specifications:

(a) 5-40% KB05 concentrated product (b) Dilutable to achieve the desired level of biological efficacy from 50 to 10 000 ppm KB05 depending on target organism/application (c) Naturally derived ingredients are preferred (d) Ingredients appropriate for agricultural or veterinary end application must be used (e) The concentrate to be suitable for possible use in personal care leave on and wash off products.

Various formulation types have been considered to achieve an effective KB05 concentration. These options included:

(a) Oil in water emulsion;

(b) Suspension of very finely divided, insoluble active that is dispersible in water; and (c) Direct solubilisation of active.

The aim was to prepare a useable concentrate that could be diluted with water or another convenient vehicle to deliver the appropriate concentration of KBO5 for the target organism.

(a) Oil in water emulsion

Non Polar solvents: These were found to be largely ineffective at solubilising the KBO5, some material was dissolved but this is believed to be fatty material and chlorophyll but not the bulk of the KBO5.

Given the solid state of the KBO5, the first step in producing an emulsifiable concentrate is to find a suitable hydrophobic solvent for the KBO5 and then a complimentary surfactant system to act as emulsifying agent.

A range of hydrophobic solvents were tested to check for their ability to dissolve KBO5. Pine oil and toluene gave the best results but solubility was not very good in any of the hydrophobic solvents. A stable concentrated KBO5 solution could not be achieved with the hydrophobic solvents tested. The oil in water emulsion option was ruled out.

It was noted that in many of the attempts to dissolve KBO5 with non-polar solvents, a bright green colour was the first to leach out of the material—at least some of the components are non-polar.

(b) Suspension Concentrate

In theory, finely ground water insoluble materials can be suspended in water using a suspending agent such as Xanthan gum. Tests on KBO5 show that although KBO5 is largely insoluble in water, there are some water soluble components in KBO5 that make the ground material very sticky and unsuitable for suspension concentrate preparation. The requirement for specialised grinding equipment is also a limitation.

Due to the aqua-phobic nature of KBO5, it is possible to grind the KBO5 and suspend this material in water. Dilution of this suspension concentrate with more water allows the KBO5 to be applied at an appropriate concentration.

In some applications a solubilised product has advantages as better penetration can be achieved. In other applications a suspension concentrate has benefits, the active can be concentrated on the surface of the target being treated, and a greater residual action can be achieved.

Mills: Grinding of the KBO5 can be achieved in 2 ways.
(a) Dry grinding of the KBO5 using a mill with care being taken to keep conditions cool and dry. Cryogenic grinding is an option. Mills can include but are not limited to, Hammer mills, Pin disk mills, Stone mills, ball mills, rod mills, tower mills, ring mills.
(b) Wet grinding of KBO5 can be carried out using a variety of mills. Mills can include but are not limited to, rotary stator mill, (Silverson type), ball mill, rod mill, colloid mill, ring mill etc.

Grinding can be achieved using a batch or continuous process, temperature of the grind should be kept below 30° C. to avoid the formation of a sticky residue.

Suspending agents: In order to prevent separation of the KBO5 from the water, it is necessary to include a suspending agent. If the KBO5 is ground finely enough and the concentration is high enough, a paste is formed which is self-suspending, otherwise 3 options are possible:

Mineral suspending agent: Clays such as, bentonite, sepiolite, atapulgite, fumed silica and magnesium aluminium silicate, are some examples of minerals with colloidal properties that are able to suspend KBO5.

Natural gums: Guar gum, Xanthan gum, gum acacia, gum Arabic, and starches including corn and tapioca are some of the natural gums with the potential for thickening and suspending KBO5 in water. The best of these was found to be Xanthan gum, where low inclusion rates can be used to achieve a good suspension and the thixotropic nature allows for easy handling. A 10% KBO5 suspension was successfully made using 0.1% of Xanthan gum.

Synthetic suspending agents: Carbomers, cellulose esters such as HEC, HMC, CMC and modified starches are some of the synthetic agents suitable for suspending KBO5.

The best of these was found to be carbomer, whose thixotropic nature allows the KBO5 to be suspended but can easily be pumped and poured and even further ground due to the reduction of viscosity under high shear. At less than 0.2%, a 10% suspension of KBO5 could be successfully made.

Combinations of mineral suspending agents and organic suspending agents was also effective at suspending KBO5. For example a low level of Xanthan gum, (<0.1%) in combination with bentonite, (<0.5) was successfully used to suspend 20% of KBO5.

(c) Direct Solubilisation

Polar solvent: Polar solvents were found to be effective at solubilising the KBO5. Examples of some solvents found to be effective are:

(a) Short chain alcohols, methanol, ethanol, propanol, isopropanol, butanol, isobutanol, etc. These are most effective when used hot.

(b) Glycols, mono-propylene glycol, di-propylene glycol, ethylene glycol, hexalene glycol, glycerol, Propane diol. These are also most effective when hot.

(c) Glycol ethers, g-propylene glycol monomethyl ether, di-propylene glycol monomethyl ether, butylene glycol ethers, ethylene glycol ethers.

(d) Esters, Di esters of short chain dicarboxylic acids e.g. di methyl succinic acid, dimethyl adipic acid.

(e) Ketones, acetone, Methyl isobutyl ketone, Methyl ethyl ketone.

Of the solvents tested the most preferred is mono-propylene glycol for reasons of cost, effectiveness, availability, low toxicity, non-flammability, ready biodegradability and manageable viscosity.

It was found that up to 40% of KBO5 could be solubilised in warm propylene glycol and up to 35% would remain soluble even at room temperature.

Surfactants: Anionic surfactants were found to be the most effective for use in combination with KBO5.

The phenolic nature of the KBO5 makes anionic surfactants compatible and effective.

The following anionic surfactants were used in combination with KBO5 and a polar solvent: Dodecyl benzene sulphonic acid in acid form as well as the neutralised forms such as sodium, potassium, ammonium, triethanolamine etc. (The double salts such as calcium and magnesium dodecylbenzene sulphonate were less effective), Soaps of fatty acids, primary alkane sulphonates, secondary alkyl sulphonates, caster oil sulphonate, fatty acid sulphates and sulphonates as well as ether sulphates e.g. sodium laurel sulphate and sodium laurel ether sulphates. Sulphonated alkyl polyglucosides, alkyl sulphosuccinates, alkyl and alkyl ether phosphates, fatty acid isethionates, acyl sarcosinates.

Two anionic surfactants gave best results these were, secondary alkyl sulphonates (SAS) and sulphonated alkyl polyglucosides.

SAS in combination with propylene glycol dissolved KB05, allows the formation of a microemulsion with water that is stable and easily diluted. This combination was found to give very good biological efficacy. For example efficacy was achieved at a level of 100 ppm KBO5 against *botrytis* fungi. SAS although petroleum based is readily biodegradable and relatively mild in contact with skin. It is approved for use in wash off cosmetic products as well as cleaning of food contact areas.

EXAMPLE

KBO5 10 to 20%
SAS 2 to 20%
Propylene glycol 5 to 60%
Water 5 to 60%

Sulphonated alkyl polyglucosides have the advantage of being produced from almost 100% renewable resourced materials. One of these was found most suitable-Poly Suga®Nate 160P—Sodium Hydroxypropylsulfonate Lauryl-Glucoside Crosspolymer. This material is extremely mild to the skin, and also able to produce a stable solution in combination with KBO5 and propylene glycol or propane diol.

Solubilising the KB05 using water, co-solvents and surfactants:

(a) Various hydrophilic/partially hydrophilic solvents were tested to establish their ability to act as a co-solvent with water to solubilise KB05, the most promising of these included: Estersol, Acetone, Ethanol, Monopropylene glycol, glycol ethers and Ethyl lactate.

(b) Various anionic surfactants were also tested alone and in combination with the solvents listed above. The most promising included secondary alkyl sulphonate (SAS), Dodecyl Benzene sulphonic acid (DDBSA) and its salts and sulphonated castor oil. Only anionic surfactants were considered, limiting our choices, as non-ionic surfactants are known to deactivate phenolic disinfecting compounds.
  (c) A phosphate ester of nonyl phenol ethoxylate gives excellent solubilisation but nonyl phenol derivatives have questionable environmental impact profiles.
  (d) The pH was also investigated to establish if this factor could influence the solubility of the active material KB05. Acidic environments showed increased solubility.

The best of the initial direct solubilisation formulations is tabulated below:

| Solvents | XI 72A % w/w | XI 72B % w/w | X 117A % w/w |
|---|---|---|---|
| KB05 | 10.0 | 10.0 | 10.0 |
| DI water | 39.9 | 39.9 | 40.0 |
| Monopropylene Glycol | 30.0 | 30.0 | |
| Ethanol | 10.0 | 10.0 | |
| Ethyl Lactate | | | 40.0 |
| SAS 93 | 10.0 | | 10.0 |
| DDBSA | | 10.0 | |
| Xanthan Gum | 0.1 | 0.1 | |
| | | | |
| Total | 100.0 | 100.0 | 100.0 |
| pH | ca. 6.5 | <2 | ca. 6.5 |
| Flashpoint | <45° C. | <45° C. | <45° C. |

The formulations tabulated above are all dark brown solutions with a fairly high level of brown insoluble residue that precipitates to the bottom.

Xanthan gum was included in the formulations to reduce insoluble suspensions from precipitating—only partial success was achieved.

The formulations above were tested for biological efficacy against *Botrytis cinerea*, a fungus that infects grapes. XI 72C a version of XI 72A filtered to remove the insoluble residue was included in the tests. Tests were run at the same active concentration of 1000 ppm. (0.1% w/w)

Results of initial Efficacy:
  (a) All the formulations gave better efficacy than ethanol/water based preparation.
  (b) Unfiltered XI 72A and filtered XI 72C were not different at 1:100 dilution.
  (c) No advantage could be found for neutral SAS or acidic DDBSA based formulations.
  (d) Slightly lower efficacy was achieved with X 117A but this sample was still better than an ethanol KB05 mixture diluted in water to give a KB05 concentration of 1000 ppm.

Further development was done to:
  (a) Reduce the use of flammable solvents.
  (b) Determine if a neutral formulation could be effective thus reducing the hazard classification and the chance of acid hydrolysis of the KBO5
  (c) See if a reliable naturally derived surfactant could be found.
  (d) See if a very mild surfactant could be found suitable for cosmetic applications.
  (e) Increase the level of KBO5 in the formulation.

Reduction of flammability: Potential handling and transportation restrictions and costs associated with products classified as flammable led us to conduct further formulation work to eliminate the problem. The aim was to increase the flashpoint to above 62° C. without affecting the solubility of KBO5. The work included
  (a) Reducing the level of ethanol.
  (b) Replacing ethanol with less flammable solvents such as IPA and ethyl lactate.
  (c) Increasing the level of propylene glycol The best results were achieved with higher levels of propylene glycol: it was found that if the level was high enough, a co solvent was not required at all. Increased levels of propylene glycol give a distinct advantage as instability due to loss of volatile solvents is also eliminated and propylene glycol is generally regarded as safe.

Naturally derived/mild surfactant: To complement the natural KBO5, it was decided to test naturally derived surfactants especially if they were mild and could be included in leave on personal care formulations. A number of anionic surfactants were considered:
  (a) Soap could be used and is well known to be compatible with phenolic compounds; the high pH and high viscosity in solution were found to be a problem.
  (b) Castor oil sulphonate is known to be fairly mild but solution stability was not very good.
  (c) Sulphonated alkyl polyglucosides (poly suganate) are believed to be the mildest of anionic surfactants and though synthetic are 100% derived from naturally occurring raw materials. Solutions prepared were almost as good as those made using SAS Biological Efficacy Trials In order to test whether the changes that had been made to the formulations to reduce flammability and corrosiveness etc., further tests were conducted against *Botrytus cinerea* using the same protocol as per earlier trials. This time placebos were included so that biological efficacy of the solvent/surfactant mix could be checked as acid anionic effects are well known against some microorganisms.

Samples Tested in Efficacy Trial 4 (All Figures in % w/w):

| Ingredient | XI 83A | XI 83B | XI 83C | XI 83D | XI 83E | XI 83F |
|---|---|---|---|---|---|---|
| DI water | 39.9 | 49.9 | 39.9 | 49.9 | 39.9 | 49.9 |
| KB05 | 10.0 | — | 10.0 | — | 10.0 | — |
| MPG | 30.0 | 30.0 | — | — | 30.0 | 30.0 |
| Ethanol | 10.0 | 10.0 | — | — | 10.0 | 10.0 |
| Ethyl Lactate | — | — | 40.0 | 40.0 | — | — |
| SAS 93 | 10.0 | 10.0 | — | — | — | — |
| DDBSA | — | — | 10.0 | 10.0 | 10.0 | 10.0 |
| Xanthan gum | 0.1 | 0.1 | 0.1 | 0.1 | 0.1 | 0.1 |
| | | | | | | |
| Total | 100.0 | 100.0 | 100.0 | 100.0 | 100.0 | 100.0 |
| pH undiluted | 6.5 | 6.4 | 1.8 | 1.8 | 1.8 | 1.8 |

Efficacy Trial 4 Results Summary:
  (a) All samples containing KBO5 were effective against *Botrytus*.
  (b) Sample XI 83C using only ethyl lactate was less effective on day 4 than XI 83E containing MPG and ethanol, both are acidic formulations containing DDBSA.
  (c) The acidic placebo formulations were both more effective than the neutral XI 83B sample, ethyl lactate containing sample XI 83D was not as effective as XI 83F.
  (d) The Blanc XI 83B gave a similar effect to the water control indicating that all the efficacy of XI 83A could be attributed to KBO5, the rest of the ingredients acting as an effective vehicle for the active.
(e) All of the samples tested gave an unacceptably low flash point, and while DDBSA based formulations had the potential for better performance based on the acid anionic effect, the benefit was outweighed by the corrosive effects of the low pH.

Efficacy Trial 5 formulations tested: Following the results of trial 4, further development was undertaken and trial 5 was to test formulations that contained only lower flammability solvents and also the very mild polysuganate 160 surfactant as a replacement for DDBSA or SAS.

Samples Tested in Efficacy Trial 5 (All Figures in % w/w):

| Ingredient | XI 86D | XI 86DP | XI 87B | XI 87BP | XI 87C | XI 87CP | XI 87D | XI 87DP |
|---|---|---|---|---|---|---|---|---|
| DI water | 29.9 | 39.9 | 28.4 | 39.7 | 28.3 | 49.9 | 28.3 | 39.8 |
| KB05 | 10.0 | — | 10.0 | — | 10.0 | — | 10.0 | — |
| MPG | 50.0 | 50.0 | 40.0 | 40.0 | 50.0 | 30.0 | 50.0 | 50.0 |
| Ethanol | — | — | — | — | — | — | — | — |
| Ethyl Lactate | — | — | 10.0 | 10.0 | — | — | — | — |
| SAS 93 | 10.0 | 10.0 | 10.0 | 10.0 | 10.0 | 10.0 | — | — |
| Polysuganate 160 | — | — | — | — | — | — | 10.0 | 10.0 |
| Xanthan gum | 0.1 | 0.1 | 0.1 | 0.1 | 0.1 | 0.1 | 0.1 | 0.1 |
| Citric acid | — | — | 1.5 | 0.2 | 1.6 | 0.15 | 1.6 | 0.1 |
| Total | 100.0 | 100.0 | 100.0 | 100.0 | 100.0 | 100.0 | 100.0 | 100.0 |
| pH undiluted | 6.3 | 6.4 | 4.5 | 4.5 | 4.5 | 4.5 | 4.5 | 4.5 |

Efficacy Trial 5 Results Summary:
(a) All KBO5 containing samples performed as well as the reference sample XI 72 A.
(b) XI 86DP performed as well as XI 87 CP—an acid anionic effect can be discounted at an acceptably low pH (pH low enough to give an effective acid anionic effect such as seen in sample XI 83 F in trial 4 would also be classified as corrosive)
(c) Ethyl lactate at a level found in XI 87B does not show any negative effects as seen with XI 83 C where growth was seen on day 4.
(d) Polysuganate 160 used in XI 87 D is a useful substitute for DDBSA or SAS if a mild naturally derived anionic surfactant is required.

Increasing the level of KBO5: for economic reasons as well as for use in preparations where higher levels of KBO5 are required, work was done to try and increase the dissolved KBO5 level.
(a) It was found that finely ground KBO5 could be dissolved in warm propylene glycol at fairly high levels as long as the solution did not contain water. The water competes with the KBO5 for the propylene glycol and separation occurs. If a surfactant with hydrotropic properties such as SAS is added with the water, this problem is overcome.
(b) We were able to produce a 30% concentrate of KBO5 in propylene glycol. When added to water a cloudy emulsion is produced which does not remain stable for too long, if SAS is added, a stable pearly emulsion is formed. Similar effects are achieved with poly suganate though not as stable as with SAS.
(c) It was possible by combining high levels of propylene glycol and SAS 93 and water, to produce a concentrate containing 20% KBO5. This 20% concentrate could be diluted with water to produce a stable ready to use formulation.
(d) A similar product was also prepared using polysuganate instead of SAS.

Efficacy Trial 6—Formulations Tested
After trial 5 and the success in increasing the KBO5 level, it was decided to focus on a 20% KBO5 solution using MPG as the solvent and SAS as the surfactant. Once again the same protocol for efficacy testing was followed, but different concentrations were used in an effort to find the minimum effective concentration.

Samples Tested in Efficacy Trial 6 (All Figures in % w/w):

| Ingredient | XI 93D | XI 93E |
|---|---|---|
| DI water | 25.5 | 22.55 |
| KB05 | 20.0 | 20.0 |
| MPG | 30 to 50 | 47.0 |
| SAS 93 | 5 to 20 | 7.5 |
| Citric acid | — | 2.95 |
| Total | 100.0 | 100.0 |
| pH undiluted | 6.4 | 4.5 |

Efficacy Trial 6 Results Summary:
(a) Both samples give good efficacy against *Botrytis* for at least four days at concentrations as low as 250 ppm.
(b) At 100 ppm growth occurs at day 2.
(c) The growth is slightly higher at the lower pH of 4.5
(d) At day 2 the growth of both samples is less than the untreated control indicating at least some activity against *botrytis*.
(e) 250 ppm should be considered as the minimum efficacy level for XI 93D and 93E against *Botrytis*.
(f) XI 93E is an effective yet simple formulation.

Manufacturing of concentrates: A number of ways of manufacturing the concentrates was investigated, the most successful was found to be the manufacture of a 30% concentrated solution of KBO5 and using this concentrate in the manufacture of surfactant including products. It is possible to finely grind the KBO5 and then combine this with the other ingredients and mix while heating but this seems to result in less solubilisation of the KOB5.

CONCLUSION (a) Mono-propylene glycol is an effective solvent for KBO5 and if kept anhydrous, the KBO5 remains stable in this simple mixture. This mixture could act as a low hazard stable source of KBO5 that can be mixed with the desired anionic surfactant and water to make formulations suitable for various applications.
(b) SAS has proven to be the best surfactant for producing stable solutions/micro emulsions of KBO5 in combination with propylene glycol, and where appropriate this mixture should be used.
(c) Polysuganate is a very mild anionic surfactant that can be used in leave on cosmetic applications; it has the added advantage of being 100% naturally derived from renewable resources.

The invention claimed is:
1. A fungicide preparation, which includes
(a) an extract and/or isolate of *Galenia africana*; and
(b) mono-propylene glycol as a solvent and/or sodium alkyl sulfate (SAS) as a surfactant and/or polysuganate as a mild anionic surfactant.
2. The preparation as claimed in claim 1, in which the extract and/or isolate is KB05.

3. The preparation as claimed in claim 2, which includes the monopropylene glycol as a solvent for the KB05, wherein, if kept anhydrous, the KB05 remains stable in the preparation.

4. The preparation as claimed in claim 3, wherein the preparation is a non-hazardous stable source of KB05 that can be mixed with a desired anionic surfactant and water to make formulations.

5. The preparation as claimed in claim 3, which includes SAS as the surfactant and propylene glycol for producing stable solutions and/or micro emulsions of KB05.

6. The preparation as claimed in claim 1, which includes polysuganate as a mild anionic surfactant, wherein the preparation is a leave-on cosmetic.

7. The preparation as claimed in claim 6, in which the polysuganate is 100% naturally derived from renewable resources.

8. The preparation as claimed in claim 2, wherein the preparation comprises 5-40% KB05, wherein the preparation can be diluted to a KB05 concentration of 50-10,000 ppm with the retention of efficacy, and wherein the preparation has agricultural or veterinary uses.

9. The preparation as claimed in claim 1, wherein the preparation is an oil-in-water emulsion.

10. The preparation as claimed in claim 1, wherein the preparation is a suspension of finely divided, insoluble active ingredients that dispersible in water.

11. The preparation as claimed in claim 1, wherein the preparation is a solution of the active ingredients.

* * * * *